Jan. 11, 1949.                M. C. KUNZ                2,459,081
                    ELECTRICAL MEASURING INSTRUMENT
Filed Jan. 31, 1945                              2 Sheets-Sheet 1
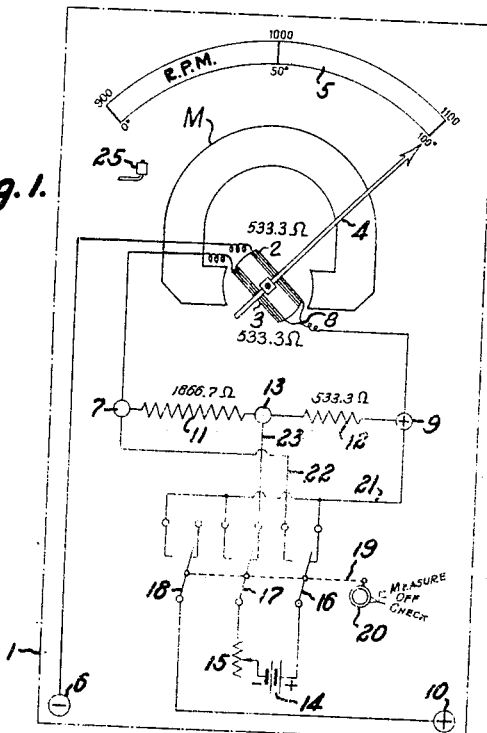
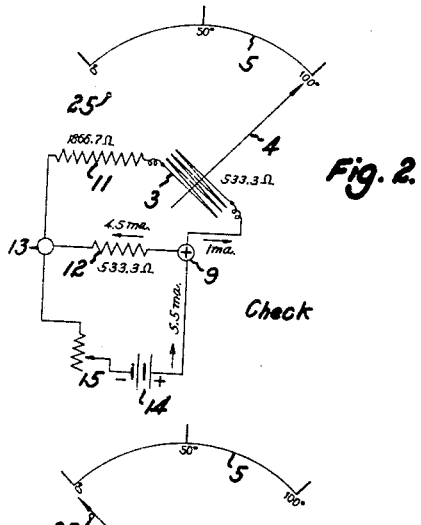
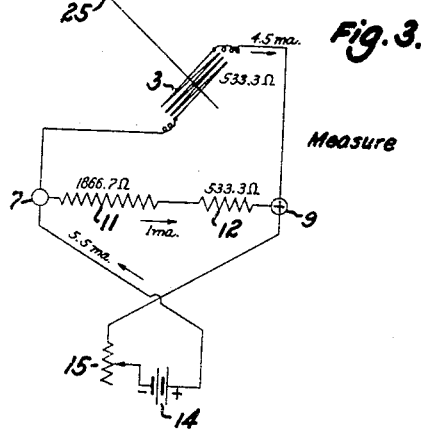
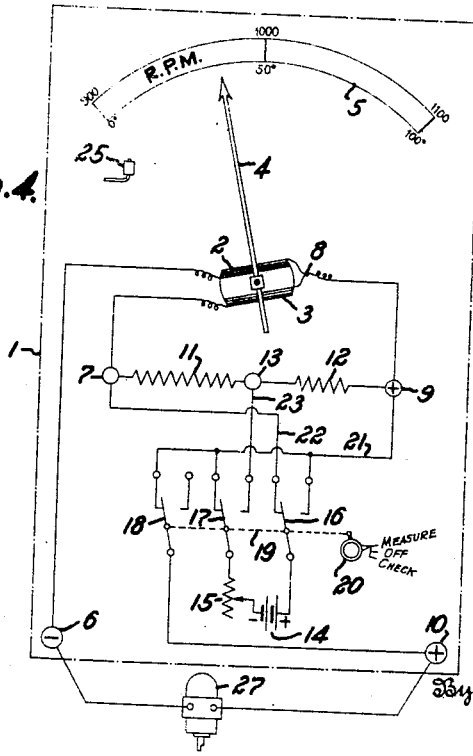
Inventor:
Miles C. Kunz,
Pierce + Scheffler,
          Attorneys.

Jan. 11, 1949.    M. C. KUNZ    2,459,081
ELECTRICAL MEASURING INSTRUMENT
Filed Jan. 31, 1945    2 Sheets-Sheet 2
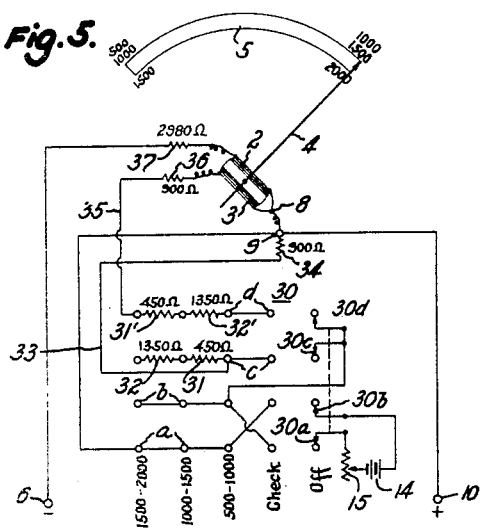
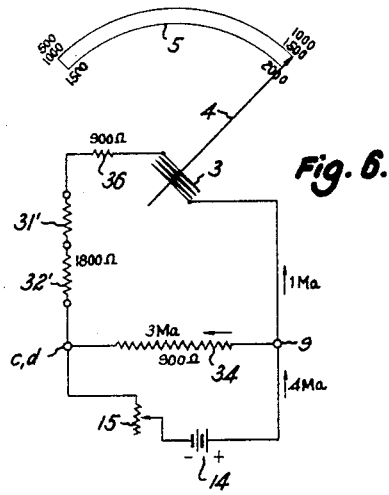
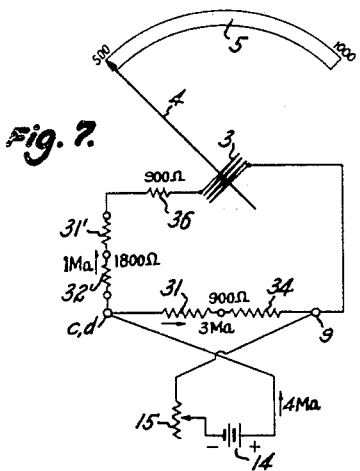
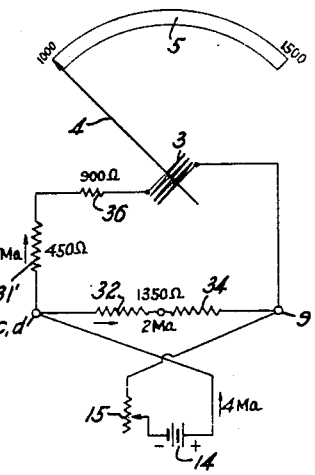
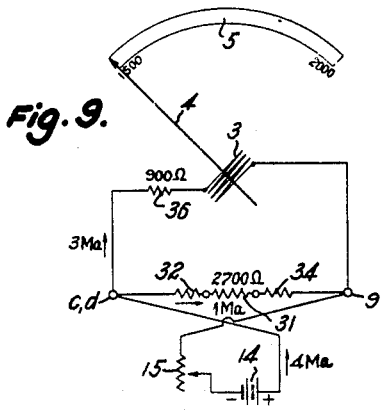
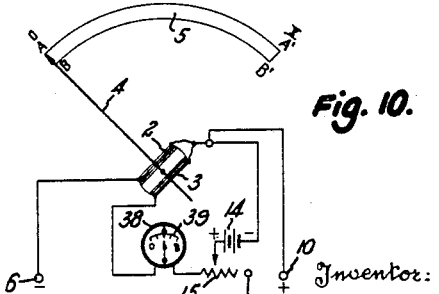

Patented Jan. 11, 1949

2,459,081

UNITED STATES PATENT OFFICE 2,459,081

ELECTRICAL MEASURING INSTRUMENT

Miles C. Kunz, Union, N. J., assignor to Weston Electrical Instrument Corporation, Newark, N. J., a corporation of New Jersey Application January 31, 1945, Serial No. 575,453

9 Claims. (Cl. 171—95)

This invention relates to electrical measuring instruments and particularly to instruments of the "suppressed zero" type in which the instrument pointer remains at the lower scale end until the measured factor rises to a substantial magnitude. This application is a continuation-in-part of and substitute for my copending application Ser. No. 526,567, filed March 15, 1944, now abandoned.

Such instruments are employed when it is desired to read minute variations or changes of a measured factor from a normal value, for example small variations of a power source potential from a normal value of 50 volts. The normal 0-100 volts instrument can be read with reasonable accuracy to about 0.25 volt when a scale having a length of 100 angular degrees is calibrated every degree. A longer scale length would permit a closer reading of voltage values in the desired region about the 50 volts normal value, but the pointer displacement is definitely limited in the conventional electrical instruments, for example instruments of the permanent magnet-pivoted coil type, and it is not practical to provide a longer visible scale than about 100°. The visible scale may be converted, in effect, into a portion of a much longer fictitious scale of 0-100 volts by the use of coil springs which exert an initial torque that retains the instrument pointer at the low end of the visible scale until a substantial voltage, for example 40 volts, is impressed across the pivoted coil. The springs and coil will preferably be so designed that the normal 50 volts graduation falls at the center of the 100° scale, and the top scale value will therefore be 60 volts. Each degree of the visible scale thus represents 0.2 volt and, as compared with the initially assumed 0-100 volts instrument, the full range scale has been expanded to 500 angular degrees and voltage change within the visible scale range of 40-60 volts can be read with reasonable accuracy to about 0.05 volt.

This mechanical suppression of the instrument zero by the coil springs is open to the objections that there are physical limits beyond which the springs cannot be rotated to develop a desired suppression torque, and that there is no simple method for checking the instrument and detecting variations in the characteristics of the springs. The electrical type of suppression, i. e. by passing a known current through a second coil to develop an initial torque that must be overcome by current through the measuring coil, affords greater design latitude but the prior instruments of this type have been open to the objection that auxiliary equipment was required for checking the instrument accuracy.

An object is to provide an instrument of the suppressed type wherein the normal zero current position of the pointer may be readily checked and adjusted if required.

An object of the present invention is to provide a novel measuring instrument of the electrically suppressed type that may be readily checked as to accuracy or calibration. An object is to provide an electrical measuring instrument including a moving system having a coil traversed by a current dependent upon the factor to be measured and a second coil traversed by a zero-suppression current from a current source, and a resistance network and switch system connecting the current source to the second coil in such manner that the instrument calibration may be readily checked. More specifically, an object is to provide a measuring instrument of the stated characteristics in which the resistance network is such that the instrument calibration may be checked by moving a double throw switch from measuring to calibrating position. Other objects of the invention are to provide electrically suppressed measuring instruments having the characteristics above stated in which the resistance network and switch system are adjustable to alter the measuring range or degree of suppression of the instrument.

These and other objects and the advantages of the invention will be apparent from the following specification when taken with the accompanying drawings in which:

Fig. 1 is a diagram of the circuits of a novel suppressed zero measuring instrument as established by adjusting of the switch element for checking the instrument, the resistance values of various circuit elements being indicated on the view;

Figs. 2 and 3 are simplified diagrams of the suppression coil circuit as adjusted for checking and measuring operations, respectively;

Fig. 4 is a circuit diagram of an electrical tachometer comprising an electrical generator and an instrument as shown diagrammatically in Fig. 1;

Fig. 5 is a circuit diagram of a multirange embodiment of the invention;

Fig. 6 is a simplified diagram of the suppression coil circuit as adjusted for a checking operation;

Figs. 7, 8 and 9 are simplified circuit diagrams of the suppression coil circuit as adjusted for measurements in different ranges; and Fig. 10 is a circuit diagram of another embodiment of the invention that may be adjusted for one or more degrees of suppression, including zero suppression.

The invention may be best understood by considering a particular set of numeral values that are typical of or have been employed in an embodiment of the invention, and the embodiment of the invention that is illustrated in Figs. 1 to 4 will therefore be described with respect to an electrical tachometer in which an instrument having a full scale deflection of 100° at a 1 milliampere input is "electrically suppressed" to restrict the visible scale to the 900–1100 revolutions per minute range to afford accurate readings of the tachometer output (speed) about the normal value of 1000 revolutions per minute.

In Fig. 1, the broken line rectangle identified by reference numeral 1 indicates the casing of a direct current measuring instrument comprising a permanent magnet field system M, and a moving system having a measuring coil 2 and a suppression coil 3 carrying a pointer 4 that is movable along a graduated scale 5. The coils 2, 3 are preferably of identical construction and characteristics to facilitate manufacture and to simplify the calibration checking operations, and the circuit connections to the coils may be entirely independent or, as shown, the coil circuits may include portions in common. The coils 2, 3 may also take the form of a single center tapped winding such as is well known in the art. Coils 2 and 3 are connected to a "−" instrument terminal 6 and to a terminal 7, respectively, and their junction 8 is connected to a terminal 9 that is positive with respect to the measuring coil 2.

A resistance network comprising two resistors 11, 12 is connected between the terminals 7, 9, and their junction 13 constitutes an additional terminal in the electrical suppression system. The "+" terminal 10 of the complete instrument assembly is connected to the terminal 9, as will be described later, when the switch element of the suppression system is adjusted for the measurement of a variable electrical characteristic of a circuit connected between the instrument terminals 6 and 10.

An adjustable current source comprising a battery 14 and adjustable resistance 15 may be connected to the resistance network 11, 12 through a polarity reversing switch to establish a suppression or, alternatively, a checking current through the suppression coil 3. The current source is connected across blades 16 and 17 of a double throw switch that may have, and preferably has, an intermediate open circuit position. The switch preferably includes a third blade 18 for opening the connection between the measuring coil 2 and the "+" terminal 10 when the switch is adjusted to checking position. The several switch blades are connected, as indicated by the dotted line 19, for simultaneous operation by a dial or knob 20 having fiducial marks for cooperation with legends "Check," "Off" and "Measure" to indicate the adjustment of the switches. For convenience of description, the righthand set of switch contacts will be termed the "back" contacts as they are engaged by the blades when the switches are adjusted, as illustrated in Fig. 1, for a checking operation, and the normally engaged lefthand set of contacts will be termed the "front contacts.

The back contact of blade 16 and the front contacts of blades 17 and 18 are connected to each other and, through the lead 21, to the terminal 9. The front contact of blade 16 is connected to terminal 7 by a lead 22, and the back contact of blade 17 is connected to the resistance network terminal 13. The back contact of blade 18 is open as there should be no current in the measuring coil 2 during the checking and adjustment of the instrument.

The resistance network and polarity reversing switch blades 16, 17 afford a simple method of checking the instrument without recourse to external equipment. A preferred correlation of resistances for obtaining a full range check of the pointer position is indicated by the values applied to Figs. 1–3 but other relationships may obtain when the pointer checking position is not the top scale graduation. Simplified diagrams of the circuit connections of the suppression coil 3 at the checking and the measuring adjustments of the switch are presented in Figs. 2 and 3. The resistor 12 has the same ohmic resistance as each of the coils 2, 3 for a full scale check of the instrument, and the resistor 11 has a value that is determined by the voltage of the current source 14 and the desired instrument suppression. The particular values shown on the drawings are appropriate for an instrument having a moving system that is displaced across the full scale by an effective current of 1 milliampere, and that is suppressed by a torque corresponding to 4.5 milliamperes through the suppression coil 3.

In the checking position of the switches, as shown in Figs. 1 and 2, the adjustable current source 14, 15 is connected across the network terminals 9, 13 and the parallel paths between these terminals are, respectively, the resistor 12 of 533.3 ohms resistance, and the coil 3 of 533.3 ohms resistance in series with the resistor 11 of 1866.7 ohms resistance. Adjustment of the resistance 15 to set the pointer 4 at the top scale graduation by establishing a current of exactly 1 milliampere through coil 3 will result in 4.5 milliamperes through the resistor 12. Upon shifting the switches to the measuring position, as shown in Fig. 3, the total effective resistance of the resistance network and coil 3 is not altered, and the voltage source 14, 15 delivers a current of 5.5 milliamperes that is made up by a current of 4.5 milliamperes through the coil 3 and a current of 1 milliampere through the serially connected resistors 11, 12. The pointer 4 is thereby retained against a stop 25, below the lower end of the scale, by a torque that is not neutralized until the current through the measuring coil 2 rises to 4.5 milliamperes.

The particular measuring circuit that is illustrated diagrammatically in Fig. 4 is a suppressed zero electrical tachometer in which a direct current generator 27 is connected between the instrument terminals 6 and 10. For the illustrated scale graduations of 900–1100, each 1° scale division represents 2 revolutions per minute, and a reading of the pointer position to one scale division affords indications of speed variation that are accurate within 0.2%. In a normal instrument of the same sensitivity of 1 milliampere per 100° scale length, and having a visible scale range of 0–1100 revolutions per minute, each scale division will represent 11 revolutions per minute and a reading of the pointer position to one scale division will be accurate to about 1%.

The assembly may be quickly checked by adjusting the switch to "Off" position and observing the pointer position. If the pointer is not alined with the lowest scale mark, it can be adjusted to that point by the usual zero-adjustment screw. The switch is then shifted to "Check" position and resistance 15 is adjusted to bring the pointer into alinement with the top scale mark. The switch is then adjusted to the "Measure" position and the apparatus is ready for use.

The electrical method of zero suppression has the further advantage over the prior mechanical suppression methods that the resistance network-switch system may be amplified to provide different degrees of suppression including, when desired, no suppression of the pointer displacement. The legends and numerical values applied to circuit elements of the instrument of Figs. 5-9 inclusive indicate a full scale deflection of 500 units at a 1 milliampere input, and measuring ranges corresponding to three degrees of zero suppression that are obtained by establishing currents in the suppression coil 3 of 1, 2 or 3 milliamperes respectively. The specific values have been furnished to facilitate an understanding of the method of operation but it is to be understood that the invention is not limited to the stated values or to any particular number of measuring ranges or to any particular ratio of adjacent measuring range values. For simplicity of design and construction, the effective network resistance across a current source of predetermined potential, i. e. the battery 14 in series with the adjustable resistance 15, should be constant for all settings of the check and range-change switch. The effective resistance for the circuit constants of Fig. 5 is 675 ohms which, for a two cell battery 14 and a current drain of 4 milliamperes, corresponds to a preselected source potential of 2.7 volts. The output voltage of the conventional flashlight cell falls off from an initial 1.5 volts as the cell ages but a stable operation at small current drains obtains down to an output of about 1.3 volts.

The range change and voltage check switch 30 of the Fig. 5 circuit is a five point, four blade switch that is preferably a conventional four bank rotary switch, but it is shown schematically, for clearness of illustration, as comprising blades 30a—30d that are movable linearly from the "Off" set of contacts a—d to the "Check" set of contacts and to the desired measuring range set of contacts. The blades 30a, 30b, and their associated contacts form a polarity reversing switch as the battery 14 and resistance 15 are connected between the blades, and the "Check" set of contacts are cross-connected to measuring range sets of contacts. The a contacts of the measuring ranges are connected to the junction of the instrument coils 2, 3 through the terminal 9, and the corresponding b contacts are connected to the joined switch blades 30c, 30d. The c and d contacts of the check position and of the lowest measuring range are directly connected, and resistances 31, 31' and 32, 32' of different values, specifically 450 and 1350 ohms in the illustrated embodiment, are connected in reverse arrangement between the respective c and d contacts of the measuring ranges. A lead 33 connects the c contact of the lowest measuring range to the terminal 9 through a fixed resistor 34 of 900 ohms, and a lead 35 connects the d contact of the highest range to the free end of the suppression coil 3 through a resistor 36 that, with the coil 3, provides a resistance of 900 ohms. A resistor 37 is connected between the negative input terminal 6 of the apparatus and the free end of the measuring coil 2, the total resistance of the measuring coil circuit between terminals 6 and 9 being 2980 ohms, as indicated by the legend adjacent the resistor 37.

The effective circuits established for the suppression coil 3 upon adjustment of switch 30 to the "Check" position and to the several measuring range positions are shown in Figs. 6 to 9 inclusive but will not be described in detail as the method of operation is obvious from the above explanation of the single range apparatus of Figs. 1 to 4 inclusive.

The calibration of the suppression current in coil 3 may also be checked by a separate milliammeter 38, see Fig. 10, that is in series with the suppression coil 3 to measure the current input to that coil from the current source 14 through the adjustable resistor 15. The scale 5 of the primary instrument may have an unsuppressed scale range of "O—X" and one or more suppressed scale ranges of "A—A" and "B—B'" corresponding to adjustment of the resistor 15 tap to a dead point 15' or, alternatively, to positions along the resistance 15 that set the pointer of instrument 38 to fiducial marks A or B on its scale 39. Other markings with appropriate associated graduations may be applied to scale 39 of the checking instrument 38 to indicate the values to be added to the measured O—X scale range value for any given adjustment of the suppression current in coil 3.

It is to be understood that the invention is not limited to the particular values or to the particular value relationships herein described as various changes that may occur to those familiar with the design of electrical measuring instruments fall within the spirit of my invention as set forth in the following claims.

I claim:

1. An electrical measuring instrument of the permanent magnet-moving coil type comprising a moving system having a suppression coil and a measuring coil, a pointer carried by the moving system and movable along a graduated scale, a source of current, circuit connections between the source of current and the suppression coil and including a switch adapted to be closed in one position to permit current to flow through said suppression coil in one direction to oppose movement of said moving system by current flow in said measuring coil, and alternatively to be closed in a second position to cause the current to flow through the suppression coil in the opposite direction, means for adjusting the magnitude of the current flowing in the suppression coil to a predetermined value, and circuit connections from the measuring coil to terminals across which an electrical potential that varies with the function to be measured may be impressed.

2. The invention as recited in claim 1 wherein the circuit connections of the measuring coil include a switch that is closed simultaneously with closure of the first switch in the second position.

3. The invention as recited in claim 1 wherein the suppression coil and the measuring coil comprise a single, center tapped winding.

4. The invention as recited in claim 1 wherein the suppression coil and measuring coil comprise individual windings.

5. An electrically suppressed measuring instrument of the permanent magnet-moving coil type, said instrument including a moving system having a measuring coil and a suppression coil, a pointer carried by the moving system, a graduated scale, and means for establishing a current through the suppression coil to develop a suppression torque that precludes movement of the pointer along the scale until the current through the measuring coil exceeds a preselected value; said means comprising a resistance network connected across the suppression coil, a current source, polarity reversing switch means for connecting said current source to said resistance network in measuring or alternatively in checking relation, the reversed direction of current through the suppression coil at the checking adjustment of said switch means developing a checking torque to displace the pointer along the graduated scale, and an adjustable resistance in circuit with said current source for setting the pointer to a preselected scale graduation.

6. An electrically suppressed instrument as recited in claim 5, wherein said resistance network includes a resistor of the same ohmic resistance as the suppression coil, and a sensitivity controlling resistor in series circuit with said suppression coil and the first resistor; and said polarity reversing switch means connects said current source across said first resistor when adjusted for checking and across said resistor in series when adjusted for measuring, whereby the suppression torque is substantially greater than the checking torque.

7. In an electrically suppressed measuring instrument of the permanent magnet-moving coil type, a moving system comprising a pointer carried by a measuring coil and a suppression coil, a graduated scale along which said pointer is movable, circuit connections for impressing across the measuring coil an electrical potential that varies with the function to be measured, a pair of resistors in series across said suppression coil, an adjustable current source, and switch means adjustable to connect said current source across said resistors in series to establish a suppression current through said suppression coil to oppose movement of said moving system by current flow in said measuring coil or alternatively to connect said current source across one of said resistors to establish a checking current of reversed polarity through said suppression coil.

8. In an electrically suppressed measuring instrument, the invention as recited in claim 7 wherein said coils are of substantially identical construction, and the resistor across which the current source is connected to establish the checking current has substantially the same ohmic resistance as the suppression coil.

9. In an electrically suppressed measuring instrument, the invention as recited in claim 7 wherein said circuit connections to said measuring coil include a switch operable simultaneously with said switch means to open the measuring coil circuit upon adjustment of said switch means to checking position.

MILES C. KUNZ.

REFERENCES CITED

The following references are of record in the file of this patent:

UNITED STATES PATENTS

| Number | Name | Date |
|---|---|---|
| 1,090,419 | Sprong | Mar. 17, 1914 |
| 1,667,624 | Corson | April 24, 1928 |
| 1,821,785 | Baget | Sept. 1, 1931 |
| 1,904,096 | St. Clair | April 18, 1933 |
| 1,904,343 | Eastham | Mar. 14, 1933 |
| 2,131,517 | Leyburn et al. | Sept. 27, 1938 |
| 2,240,955 | Mittlemann | May 6, 1941 |